United States Patent [19]

Straetker

[11] Patent Number: 5,948,029
[45] Date of Patent: Sep. 7, 1999

[54] STEERING CONTROL SYSTEM FOR TRACKED VEHICLE

[75] Inventor: John George Straetker, Waterloo, Iowa

[73] Assignee: Deere & Company, Moline, Ill.

[21] Appl. No.: 08/795,091

[22] Filed: Feb. 5, 1997

[51] Int. Cl.⁶ .............................. B62D 11/10; B62D 11/02

[52] U.S. Cl. ............................. 701/41; 701/50; 180/6.44; 180/6.48

[58] Field of Search ................................. 701/41, 44, 50; 180/6.44

[56] References Cited

U.S. PATENT DOCUMENTS

| | | | |
|---|---|---|---|
| 3,395,671 | 8/1968 | Zimmerman | 74/682 |
| 3,450,218 | 6/1969 | Looker | 180/6.48 |
| 3,917,014 | 11/1975 | Ward | 180/6.48 |
| 4,617,836 | 10/1986 | Baldwin | 180/6.44 |
| 5,390,751 | 2/1995 | Puetz et al. | 180/6.44 |
| 5,473,541 | 12/1995 | Ishino et al. | 701/50 |
| 5,477,454 | 12/1995 | Ishino et al. | 701/50 |
| 5,477,455 | 12/1995 | Ishino et al. | 701/50 |
| 5,487,007 | 1/1996 | Suzuki et al. | 701/44 |
| 5,535,840 | 7/1996 | Ishino et al. | 180/6.44 |
| 5,611,405 | 3/1997 | Ishino et al. | 180/6.44 |

OTHER PUBLICATIONS

US PAtent Application Serial No. 08/795,091, filed Feb. 5, 1997 (Attorney Docket 14644–US).
US Patent Application Serial No. 08/991,961, filed Dec. 17, 1997 (Attorney Docket 14524–US).
R. M. Ogorkiewicz, "Tank Steering Mechanisms", dated Mar. 10, 1967, The Engineer, pp. 381–383.

*Primary Examiner*—William A. Cuchlinski, Jr.
*Assistant Examiner*—Arthur D. Donnelly

[57] ABSTRACT

A steering control system for a tracked vehicle includes an engine driven variable displacement steering pump which drives a hydraulic motor. The motor drives a differential drive mechanism which drives left and right track drive wheels. An electronic control unit, as a function of steering wheel position, vehicle speed, engine speed, forward/reverse vehicle direction and other parameters, generates a command signal which controls the swashplate of the steering pump. The system operates so that, for a given position of the steering wheel, a turn curvature of the vehicle decreases as vehicle speed increases, wherein turn curvature is inversely proportional to a radius of turn. This is accomplished by calculating a turn speed value equal to the vehicle speed multiplied by a ratio of a nominal engine speed divided by sensed engine speed, and by calculating the command signal equal to a steering gain value multiplied by a ratio of the turn speed value divided by a nominal vehicle speed value.

19 Claims, 3 Drawing Sheets

STEERING CONTROL SYSTEM FOR TRACKED VEHICLE

BACKGROUND OF THE INVENTION

The invention relates to a steering control system for a tracked vehicle.

Tracked vehicles are steered by driving one track faster or slower than the other. In some tracked vehicles this is accomplished by a differential steer system which includes an engine-driven variable displacement pump which drives a fixed displacement motor. Traditionally, such tracked vehicles have been steered by simply varying the swashplate angle directly with a steering command. Such a system has aggressive steering at low vehicle speeds which decreases the operator's ability to control the vehicle when fine steering control is required. In addition, such systems have not provided the flexibility to change the performance or functional characteristics of the system.

SUMMARY OF THE INVENTION

Accordingly, an object of this invention is to provide a tracked vehicle steering control system which increases the operator's ability to control the vehicle at both low and high speeds.

A further object of the invention is to provide such a system which functions so that steering wheel position is approximately proportional to turn curvature (inverse of radius of turn) for vehicle speeds within a certain speed range.

Another object of the invention is to provide such a system wherein the steering becomes less aggressive at higher transport speeds.

These and other objects are achieved by the present invention, wherein a tracked vehicle includes a differential steer system utilizing one variable displacement pump and one fixed displacement motor with an electromechanical steering linkage. A steering control system senses steering wheel position, vehicle speed, engine speed and forward/reverse vehicle direction. As a function of these sensed inputs, a control signal is generated and is used to control the swashplate angle of a variable displacement pump which drives a steering motor which drives a differential track drive mechanism. The steering motor adds rotation to one track and subtracts rotation from the other track. This is accomplished by means of a cross shaft with direct gearing to a planetary gear set on the left side of the vehicle and reverse gearing to a planetary gear set by means of a reverser gear on the right side of the vehicle. The system functions so that steering wheel position is approximately proportional to turn curvature (inverse of radius of turn) for vehicle speeds from between 2 and 14 kilometer per hour (kph), at a nominal engine speed. Above this vehicle speed, the steering becomes less aggressive for transport speeds. This allows an operator to have better control in both lower and higher gears. A change in engine speed does not change an operator's commanded radius of turn. As tractor speed decreases to zero, the tractor angular velocity in the turn will also decrease. If the clutch pedal is depressed and the vehicle is in gear, or the gear lever is moved to the neutral position, the tractor will coast to a stop. In this case, turning will slow but not stop. This allows the operator better control over their commanded turn when stopping and starting vehicle motion. This steering system blends the advantages of a tracked vehicle steering system with the advantages of a wheeled vehicle steering system, and it can be easily tailored to optimize drivability/controllability for various applications. This steering system provides control similar to a row crop tractor during field operation and counter rotation capability during slow to zero speed conditions. Preferably, the steering wheel has fixed stops and has 600 degrees of rotation lock to lock. In addition, it is preferably self-centering, has a positive feel at the center, and requires low effort to steer.

DETAILED DESCRIPTION

This application includes a microfiche appendix including one microfiche and 63 frames.

Figure 1:
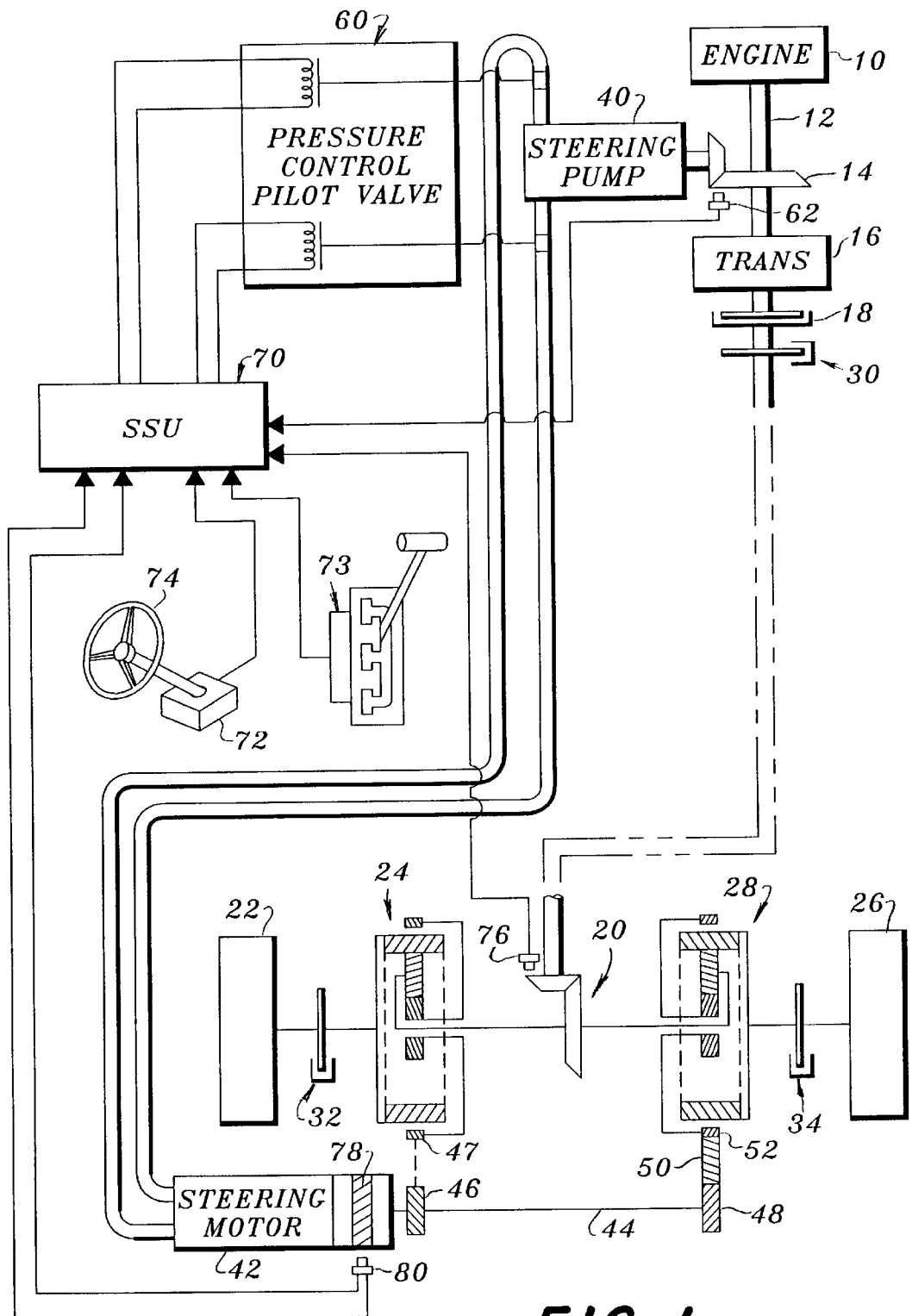
FIG. 1 is a simplified schematic diagram of a tracked vehicle drive and the control system of the present invention.
Figure 2:
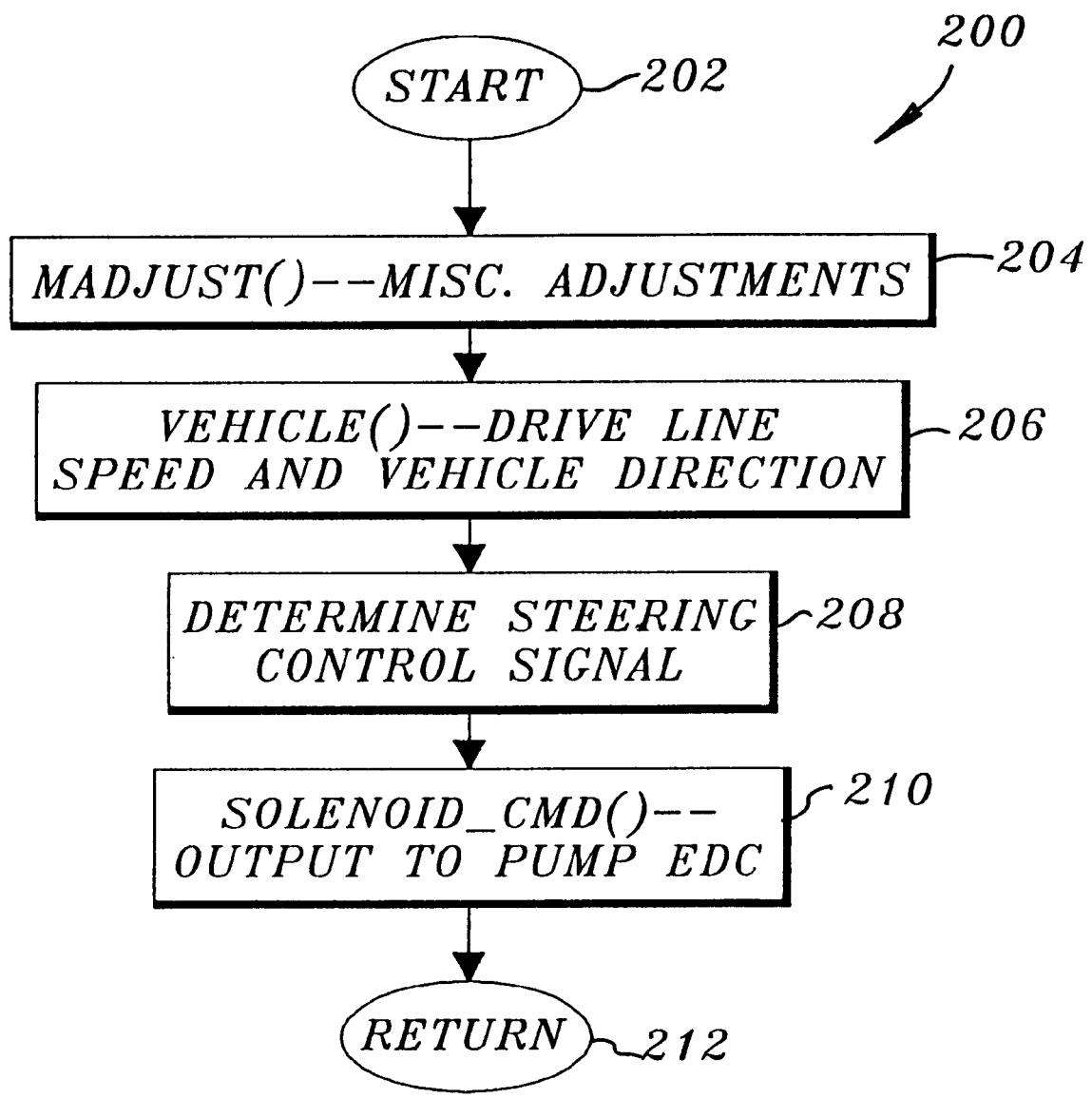
FIG. 2 is a logic flow diagram of a main loop algorithm executed by a microprocessor of the control system of FIG. 1.

Referring to FIG. 1, a drive train of a tracked vehicle includes an engine 10 with an output shaft 12 which drives a right angle gear 14 and a transmission 16. The transmission 16 drives a clutch 18 which, in turn, drives, via final or right angle drive 20, a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000 tractors, are mounted between the steering planetaries and the respective drive wheels, but are not further described because they are not involved in the steering control function which is the subject matter of this application. A parking brake 30 is coupled to shaft 18, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 24.

The swashplate (not shown) of steering pump 40 is controlled by a pressure controlled pilot valve or electronic displacement control (EDC) 60. The EDC is preferably a known two stage device with first stage including a flapper type valve and a second stage including a boost stage to the pump, such as is commercially available from Sauer-Sundstrand with minor modifications to the spool for cold weather and without a manual override function.

A rotation speed sensor 62, such as a commercially available mag pickup, mounted in proximity to the right angle drive 14, provides an engine speed signal to a steering system unit (SSU) 70. The solenoids of valve 60 are controlled by pump command signals (pump_cmd) signals generated by SSU 70.

A steering wheel rotary position transducer 72, such as a rotary potentiometer, provides to SSU 70 a steering angle signal (steer_angle) representing the position, relative to a centered position, of a spring centered, operator controlled steering wheel 74 which is preferably capable of turning through an angular range of 600 degrees. For purposes of redundancy and reliability, the steering wheel position transducer 72 preferably includes three rotary potentiometers (not shown), and a single steering angle signal, steer_angle, may derived from the signals from the three potentiometers according to a subroutine, the details of which are shown in the microfiche appendix.

A drive line rotation speed sensor 76, preferably a differential Hall-effect speed sensor such as used on production John Deere tractors, is mounted in proximity to the final drive 20, provides to the SSU 70 a final drive speed, vehicle or wheel speed signal (whl_spd). A magnetic ring 78 is mounted for rotation with the motor 42, and a Hall-effect transducer 80 mounted near the magnetic ring 78 provides to the SSU 70 a motor speed signal and a motor direction signal.

The SSU 70 includes a commercially available microprocessor (not shown) which executes a main loop algorithm 200, the steering control aspects of which are illustrated by FIG. 1. The main loop begins at step 202. In step 204 various preset parameters and constants are retrieved from memory. The values of these parameters and constants are set forth in the microfiche appendix, but can be varied depending upon the specific application. In step 206 drive line speed is determined from rotation speed sensor 76. Also in step 206 a vehicle direction (forward/reverse) signal, veh_dir, is determined. The veh_dir signal is +1 if the vehicle is moving forward or −1 if the vehicle is moving backwards. The veh_dir signal may be derived by a subroutine from signals from the drive line or wheel speed sensor 76, from a transmission shift lever transducer 73, such as described in U.S. Pat. No. 5,406,860, issued Apr. 18, 1995 to Easton et al., clutch engagement switches (not shown) and from a commanded gear signal from a powershift transmission control unit (not shown). The details of the veh_dir signal determining subroutine are set forth in the program listing in the microfiche appendix. Alternatively, the veh_dir signal could also be provided by a radar or ultrasonic vehicle speed sensing unit (not shown). Step 208 determines the steering control signal by calling the subroutine illustrated by the logic flow diagram of FIG. 3. Step 210 generates a solenoid command signal which is applied to the pressure controlled pilot valve or electronic displacement control (EDC) 60. The main loop ends at step 212.

Figure 3:
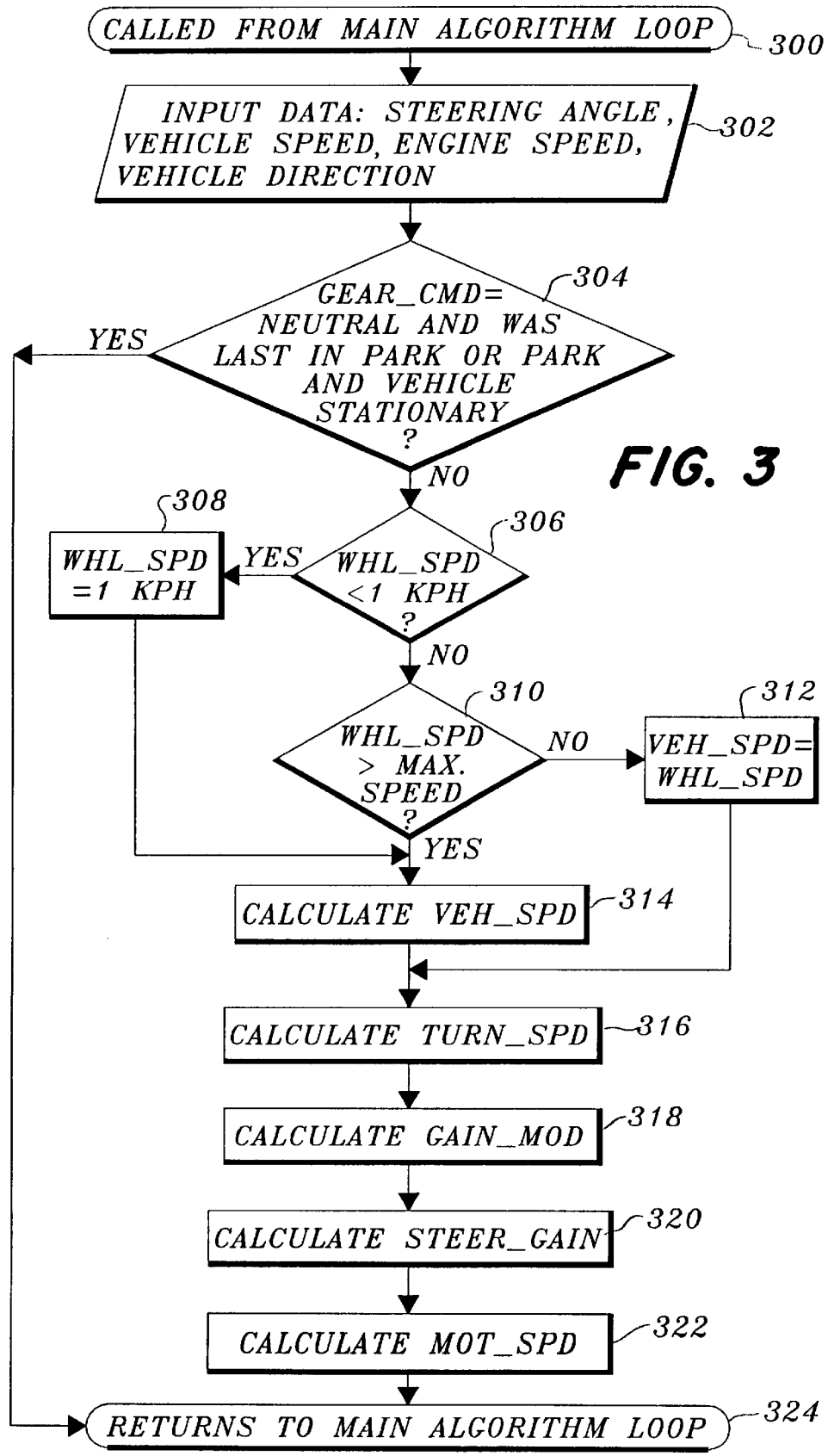
FIG. 3 is a logic flow diagram of the steering control signal calculation algorithm which is called by the main loop algorithm of FIG. 2.

Referring now to FIG. 3, the steering control signal is determined by the subroutine shown therein, which begins at step 300. Step 302 retrieves data for the steering angle (steer_angle), vehicle speed (whl_spd), engine speed (eng_spd) and vehicle direction (veh_dir).

Step 304 directs the algorithm to step 324, which returns control to the main loop, if the commanded gear signal from transducer 73 indicates that the gear shift lever is in neutral or park and the vehicle is not moving, otherwise, the algorithm proceeds from step 304 to step 306.

Step 306 directs the algorithm to step 308, which sets the wheel speed value, whl_spd, equal to 1 kph (kilometers per hour) and directs the algorithm to step 314, if sensed whl_spd value from sensor 76 is less than 1 kph, otherwise, the algorithm proceeds from step 306 to step 310. Step 310 directs the algorithm to step 312, which sets a vehicle speed calculation value, veh_spd, equal to the whl_spd value from speed sensor 76 and directs the algorithm to step 316, if the sensed whl_spd value is not greater than a maximum speed (such as 16 kph for example), otherwise, the algorithm proceeds from step 310 to step 314.

Step 314 calculates the vehicle speed value, veh_spd according to the following equation:

$$\text{veh\_spd} = \text{max\_veh\_spd} + (\text{whl\_spd} - \text{max\_veh\_spd})/K2,$$

where max_veh_spd is preset parameter such as 16 kph which can be varied depending upon the application, whl_spd is the speed value from sensor 76, and K2 is preset constant.

Step 316 calculates a turn speed value, turn_spd according to the following equation:

$$\text{turn\_spd} = (\text{veh\_spd} + \text{offset}) \times (\text{nom\_eng\_spd}/\text{eng\_spd}) + \text{adder},$$

where turn_spd is a turning speed scaling variable, veh_spd is the value from step 312 or step 314, offset is a constant, nom_eng_spd is nominal engine speed scaling constant, eng_spd is engine speed (from sensor 14), and adder is another constant.

Step 318 calculates a gain modification value, gain_mod according to the following equation:

$$\text{gain\_mod} = K1 \times (\text{turn\_spd}/\text{turn\_spd\_div}),$$

where K1 is a constant, turn_spd is the value from step 316, and turn_spd_div is a scaling constant.

Step 320 calculates a steer gain value, steer_gain, which is a modified steering angle or steering wheel position value, according to the following equation:

$$\text{steer\_gain} = ([a \times \text{steer\_angle} + (1-a) \times \text{steer\_angle}^2] \times \text{gain\_mod})/2048,$$

where "a" is a preset constant, steer_angle is the steering angle signal derived from transducer 72, and gain_mod is the value from step 318.

Step 322 calculates a motor command value, mot_spd according to the following equation:

$$\text{mot\_spd} = [(\text{steer\_gain}) \times (\text{max\_mot\_spd}/2048)] \times \text{veh\_dir},$$

where steer_gain is the value from step 320, max_mot_spd is a preset maximum motor speed value, and veh_dir is the vehicle direction value which is +1 if the vehicle is moving forward or −1 if the vehicle is moving backwards.

Finally, step 324 returns control to the main loop which outputs the steering control signal to the steering pump control unit 60. The result of steps 314–322 is that the control signal is a function of the vehicle speed signal (veh_spd), the engine speed signal (eng_spd) and the steering signal (steer_angle). As a result of step 316, a turn speed value is proportional to the vehicle speed multiplied by a ratio of a nominal engine speed divided by sensed engine speed. As a result of step 318, the control signal is proportional to a steering gain value multiplied by a ratio of the turn speed value divided by a preset turn speed divisor value. As a result of step 320 the control signal is proportional to a second power of the steering signal (steer_angle).

The various preset parameters and constants can be varied depending upon the application. For example, the various constants and parameters can be adjusted to modify the rate at which turn curvature (inversely proportional to radius of turn) varies as a function of overall vehicle speed at a constant engine speed. Over a range of vehicle speeds, the turn curvature is approximately proportional to the position of the steering wheel relative to its centered position. This range can be adjusted by varying the minimum and maximum values referenced in steps 306 and 310 and by varying the offset and adder values in step 316.

Turn curvature is approximately proportional to the position of the steering wheel relative to its centered position between vehicle speeds of 2 kph and 14 kph. Above this range, the steering becomes naturally less aggressive for transport speeds. Below this range, the steering becomes naturally more aggressive for counter rotation capability. This allows an operator to have better control over the full range of gears. Also, the minimum and maximum driveline or vehicle speed values can be adjusted so as to widen or narrow the vehicle speed range over which steering wheel position is approximately commanding a radius of turn.

A change in engine speed does not change an operators commanded radius of turn. As the tractor's speed decreases to zero, the tractor turning rate will also decrease. If the clutch pedal is depressed and the vehicle is in gear, or the gear lever is moved to the neutral position, the tractor will coast to a stop. In this case, turning will slow but not stop. This gives the operator better control over their commanded turn when stopping and starting vehicle motion during a turn.

The pump command signal may be used as the command in a closed loop control algorithm using the motor speed signal from Hall-effect sensor 80 as the feedback signal. The pump command may also be used as the command in an open loop system. The pump command would be modified and scaled appropriately and sent to an output driver routine (not shown). The SSU 70 and output driver software output the commanded current level to the EDC 60. The EDC 60 controls the pump 40 swashplate angle which in turn controls the speed of the motor 42 and ultimately the differential speed between the two track drives 24 and 28.

For further details regarding this algorithm, reference is made to the computer program listing included in the microfiche appendix. Portions of the computer program are in assembly language and portions are in C language.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A steering control system for a tracked vehicle having an engine-driven variable displacement pump which is responsive to a control signal and which drives a steering motor which drives a differential track drive mechanism, an operator manipulated steering member, and having left and right tracks driven by the differential drive mechanism, the control system comprising:

a vehicle speed sensor for generating a vehicle speed signal;

an engine speed sensor for generating an engine speed signal;

a rotary position sensor coupled to the steering member and generating a steering signal representing a position of the steering member; and a control unit for generating the control signal as a function of the vehicle speed signal, the engine speed signal and the steering signal to control speed of said motor and thereby control a turning radius of the vehicle.

2. The steering control system of claim 1, wherein the control unit comprises:

means operative at a given position of the steering member for generating the control signal so that a turn curvature of the vehicle remains constant as vehicle speeds varies within a preset range of speeds, and so that, above a certain vehicle speed, the turn curvature decreases as vehicle speed increases, wherein turn curvature is inversely proportional to a radius of turn.

3. The steering control system of claim 1, wherein the control unit comprises:

means for calculating a turn speed value proportional to the vehicle speed multiplied by a ratio of a nominal engine speed divided by sensed engine speed; and means for calculating the control signal proportional to a steering gain value multiplied by a ratio of the turn speed value divided by a preset turn speed divisor value.

4. The steering control system of claim 1, further comprising:

means for determining a forward/reverse travel direction of the vehicle and for generating a travel direction signal representative thereof, the control unit generating the control signal as a function of the steering signal, the vehicle speed signal, the engine speed signal and the travel direction signal.

5. The steering control system of claim 1, wherein:

the steering signal represents a position of the steering member relative to a centered position.

6. The steering control system of claim 1, wherein:

the control signal has a magnitude which is proportional to a second power of a magnitude of the steering signal.

7. A steering control system for a tracked vehicle having an engine-driven variable displacement pump which is responsive to a control signal and which drives a steering motor which drives a differential track drive mechanism, an operator manipulated steering member, the differential drive mechanism driving left and right tracks at speeds proportional to a magnitude of a control signal, comprising:

a steering sensor for generating a steering signal representing a position of the steering member;

means for generating a forward/reverse vehicle direction signal;

a drive line speed sensor coupled to the drive line for generating a drive line speed signal; and a control unit for generating the control signal as a function of the forward/reverse vehicle direction signal and of a product of the steering signal and the drive line speed signal.

8. The steering control system of claim 7, further comprising:

means for comparing the drive line speed signal to a threshold speed level; and means for modifying the control signal depending upon whether the drive line speed is greater than or not greater than the threshold speed.

9. The steering control system of claim 7, further comprising:

an engine speed sensor for sensing a speed of the engine;

means for comparing the drive line speed signal to a threshold speed level;

means operable if the drive line speed signal is not greater than the threshold speed level for setting a vehicle speed value equal to a magnitude of the drive line speed signal;

means operable if the drive line speed signal is greater than the threshold speed level for calculating the vehicle speed, veh_spd, according to the following equation:

$$veh\_spd=max\_veh\_spd+(whl\_spd-max\_veh\_spd)/K2,$$

where max_veh_spd is preset parameter, whl_spd is the drive line speed value, and K2 is a constant; and means for determining the control signal as a function of veh_spd and sensed engine speed.

10. The steering control system of claim 7, wherein:
the steering signal represents a position of the steering mender relative to a centered position.

11. A steering control system for an engine driven tracked vehicle having an operator manipulated steering member, and having left and right tracks driven by an engine through a transmission, a drive line and a differential drive mechanism which drives the left and right tracks at speeds proportional to a magnitude of a control signal, the differential drive mechanism including an engine-driven variable displacement pump which is responsive to the control signal and which drives a steering motor, comprising:

a steering sensor for generating a steering signal representing a position of the steering member;

an engine speed sensor for sensing a speed of the engine;

a drive line speed sensor coupled to the drive line for generating a vehicle speed signal; and a control unit for generating the control signal, wherein the control signal is proportional to a product of the steering signal and the vehicle speed signal and inversely proportional to engine speed, the control unit thereby controlling speed of said motor and thereby controlling a turning radius of the vehicle.

12. A steering control system for a tracked vehicle having an operator manipulated steering member, and having left and right tracks driven by an engine via a drive line which drives a differential drive mechanism which drives the left and right tracks at speeds proportional to a magnitude of a control signal, the differential drive mechanism including an engine-driven variable displacement pump which is responsive to the control signal and which drives a steering motor, comprising:

a vehicle speed sensor for generating a sensed vehicle speed signal;

means for generating a forward/reverse vehicle direction signal;

a rotary position sensor coupled to the steering member and generating a steering signal representing a position of the steering member;

a control unit for generating the control signal as a function of the forward/reverse vehicle direction signal, the sensed vehicle speed signal and the steering signal, the control unit comprising means for comparing the sensed vehicle speed signal to a threshold speed level, and means for modifying the control signal depending upon whether the sensed vehicle speed is greater than or not greater than the threshold speed level, the control unit thereby controlling speed of said motor and thereby controlling a turning radius of the vehicle.

13. The steering control system of claim 12, wherein:
the vehicle speed sensor comprises a rotary speed sensor coupled to the drive line.

14. The steering control system of claim 12, further comprising:

means operable if the sensed vehicle speed signal is not greater than the threshold speed level for setting a vehicle speed value equal to the sensed vehicle speed signal; and means operable if the sensed vehicle speed signal is greater than the threshold speed level for calculating the vehicle speed value, veh_spd, according to the following equation:

$$veh\_spd=max\_veh\_spd+(whl\_spd-max\_veh\_spd)/K2,$$

where max_veh_spd is preset parameter, whl_spd is the drive line speed value, and K2 is a preset constant.

15. A steering control system for a tracked vehicle having an operator manipulated steering member, and having left and right tracks driven by a differential drive mechanism which is responsive to a control signal, comprising:

a vehicle speed sensor for generating a vehicle speed signal;

an engine speed sensor for generating an engine speed signal;

a rotary position sensor coupled to the steering member and generating a steering signal representing a position of the steering member; and a control unit for generating the control signal as a function of the vehicle speed signal, the engine speed signal and the steering signal, the control unit comprising means for calculating a turn speed value proportional to the vehicle speed multiplied by a ratio of a nominal engine speed divided by sensed engine speed, and means for calculating the control signal proportional to a steering gain value multiplied by a ratio of the turn speed value divided by a preset turn speed divisor value.

16. A steering control system for a tracked vehicle having an operator manipulated steering member, and having left and right tracks driven by a differential drive mechanism which is responsive to a control signal, comprising:

a vehicle speed sensor for generating a vehicle speed signal;

an engine speed sensor for generating an engine speed signal;

a rotary position sensor coupled to the steering member and generating a steering signal representing a position of the steering member;

means for determining a forward/reverse travel direction of the vehicle and for generating a travel direction signal representative thereof; and a control unit for generating the control signal as a function of the vehicle speed signal, the engine speed signal, the steering signal, and the travel direction signal.

17. A steering control system for a tracked vehicle having an operator manipulated steering member, and having left and right tracks driven by a differential drive mechanism which is responsive to a control signal, comprising:

a vehicle speed sensor for generating a vehicle speed signal;

an engine speed sensor for generating an engine speed signal;

a rotary position sensor coupled to the steering member and generating a steering signal representing a position of the steering member; and a control unit for generating the control signal as a function of the vehicle speed signal, the engine speed signal and the steering signal, the control signal having a magnitude which is proportional to a second power of a magnitude of the steering signal.

18. A steering control system for a tracked vehicle having an operator manipulated steering member, and having left and right tracks driven by an engine via a drive line which drives a differential drive mechanism which drives the left and right tracks at speeds proportional to a magnitude of a control signal, comprising:

a steering sensor for generating a steering signal representing a position of the steering member;

an engine speed sensor for sensing a speed of the engine;

a drive line speed sensor coupled to the drive line for generating a drive line speed signal;

means for comparing the drive line speed signal to a threshold speed level;

a control unit for generating the control signal as a function of a product of the steering signal and the drive line speed signal;

means operable if the drive line speed signal is not greater than the threshold speed level for setting a vehicle speed value equal to a magnitude of the drive line speed signal;

means operable if the drive line speed signal is greater than the threshold speed level for calculating the vehicle speed, veh_spd, according to the following equation:

$$veh\_spd = max\_veh\_spd + (whl\_spd - max\_veh\_spd)/K2,$$

where max_veh_spd is preset parameter, whl_spd is the drive line speed value, and K2 is a constant; and means for determining the control signal as a function of veh_spd and sensed engine speed.

19. A steering control system for a tracked vehicle having an operator manipulated steering member, and having left and right tracks driven by an engine via a drive line which drives a differential drive mechanism which drives the left and right tracks at speeds proportional to a magnitude of a control signal, comprising:

a vehicle speed sensor for generating a sensed vehicle speed signal;

a rotary position sensor coupled to the steering member and generating a steering signal representing a position of the steering member;

a control unit for generating the control signal as a function of the sensed vehicle speed signal and the steering signal, the control unit comprising means for comparing the sensed vehicle speed signal to a threshold speed level, and means for modifying the control signal depending upon whether the sensed vehicle speed is greater than or not greater than the threshold speed level;

means operable if the vehicle speed is not greater than the threshold speed for setting a vehicle speed value equal to the vehicle speed signal; and means operable if the vehicle speed is greater than the threshold speed for calculating the vehicle speed value, veh_spd, according to the following equation:

$$veh\_spd = max\_veh\_spd + (whl\_spd - max\_veh\_spd)/K2,$$

where max_veh_spd is preset parameter, whl_spd is the drive line speed value, and K2 is a preset constant.

* * * * *